United States Patent
Chiang et al.

(10) Patent No.: US 8,705,593 B2
(45) Date of Patent: Apr. 22, 2014

(54) EVALUATION DEVICE AND METHOD FOR PROVIDING A TRANSCEIVER SYSTEM WITH PERFORMANCE INFORMATION THEREOF

(75) Inventors: Ching-Tai Chiang, Kaohsiung (TW); Rong-Ching Wu, Kaohsiung (TW); Chen-Sen Ouyang, Kaohsiung (TW); Jong-Ian Tsai, Kaohsiung (TW)

(73) Assignee: I Shou University, Kaohsiung (TW)

( * ) Notice: Subject to any disclaimer, the term of this patent is extended or adjusted under 35 U.S.C. 154(b) by 14 days.

(21) Appl. No.: 13/357,952

(22) Filed: Jan. 25, 2012

(65) Prior Publication Data

US 2013/0188672 A1     Jul. 25, 2013

(51) Int. Cl.
*H04B 1/38* (2006.01)

(52) U.S. Cl.
USPC ........... 375/219; 375/316; 375/287; 375/285; 375/295; 375/299; 375/347; 375/349; 375/220; 375/221; 375/224; 375/227; 375/228

(58) Field of Classification Search
USPC ......... 375/219, 316, 267, 285, 295, 299, 347, 375/349, 220, 221, 224, 227, 228
See application file for complete search history.

(56) References Cited

U.S. PATENT DOCUMENTS

2008/0117961 A1* 5/2008 Han et al. ...................... 375/227
2012/0128051 A1* 5/2012 Chiang et al. ................. 375/227
2012/0129466 A1* 5/2012 Chiang et al. ............. 455/67.13

OTHER PUBLICATIONS

Juan M. Romero-Jerez and Andrea J. Goldsmith, Performance of Multichannel Reception with Transmit Antenna Selection in Arbitrarily Distributed Nakagami Fading Channels, dated Apr. 2009.*

* cited by examiner

*Primary Examiner* — Siu Lee
(74) *Attorney, Agent, or Firm* — Alan Kamrath; Kamrath IP Lawfirm, P.A.

(57) ABSTRACT

An evaluation device is configured to provide a transceiver system with performance information thereof. The transceiver system models a channel between a transmitter and a receiver thereof using Nakagami distribution with a fading parameter. The evaluation device includes a setting module operable to set an average signal-to-noise rate (SNR) for the channel between the transmitter and the receiver, a computing module operable to estimate a symbol error rate related to a signal received by the receiver from the transmitter based upon the fading parameter and the average SNR, and an output module operable to provide the average SNR and the symbol error rate as the performance information of the transceiver system.

6 Claims, 9 Drawing Sheets

FIG. 10

EVALUATION DEVICE AND METHOD FOR PROVIDING A TRANSCEIVER SYSTEM WITH PERFORMANCE INFORMATION THEREOF

BACKGROUND OF THE INVENTION

1. Field of the Invention

The present invention relates to an evaluation device and method for providing a transceiver system with performance information thereof, more particularly to an evaluation device and method for providing a transceiver system, which models a channel thereof using Nakagami distribution, with performance information thereof.

2. Description of the Related Art

Figure 1:
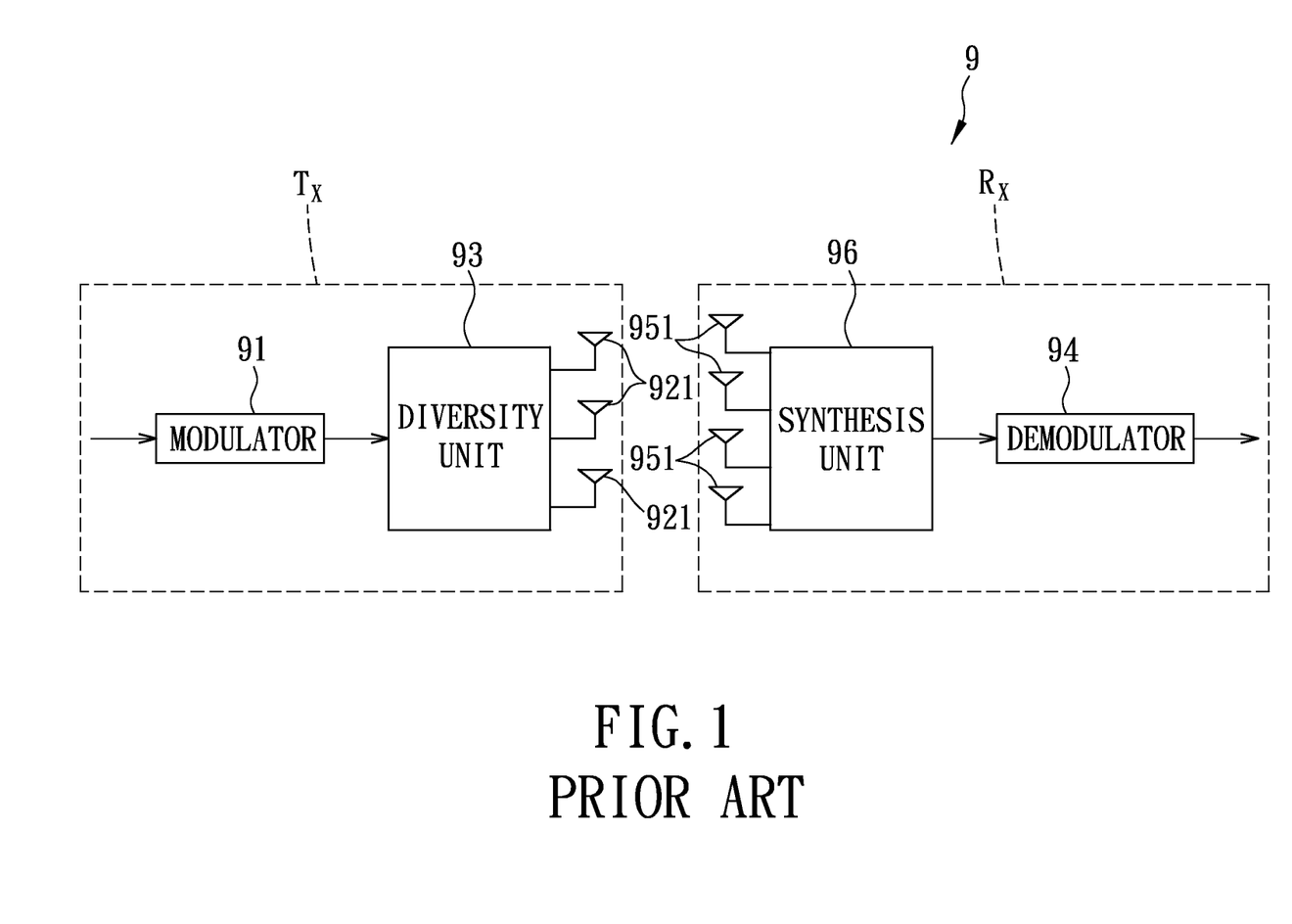
FIG. 1 is a block diagram illustrating a conventional transceiver system.

Referring to FIG. 1, a conventional transceiver system 9 under a transmit antenna selection/maximal-ratio combining (TAS/MRC) scheme includes a transmitter ($T_X$) and a receiver ($R_X$). The transmitter ($T_X$) includes a modulator 91, a diversity unit 93 electrically connected to the modulator 91, and a plurality of transmit antennas 921 electrically connected to the diversity unit 93. The receiver ($R_X$) includes a demodulator 94, a synthesis unit 96 electrically connected to the demodulator 94, and a plurality of receive antennas 951 electrically connected to the synthesis unit 96. The conventional transceiver system 9 is operable, in advance, to estimate the channels between the transmitter ($T_X$) and the receiver ($R_X$), so that the diversity unit 93 of the transmitter ($T_X$) is operable to select one of the transmit antennas 921, which results in a channel that has relatively better performance, for transmitting a signal generated by the modulator 91 so as to optimize the performance of the conventional transceiver system 9. Then, when the receive antennas 951 of the receiver ($R_X$) receive the signal from the selected one of the transmit antennas 921, the synthesis unit 96 of the receiver ($R_X$) is operable to weight and synthesize signals received by the receive antennas 951 thereof.

Figure 2:
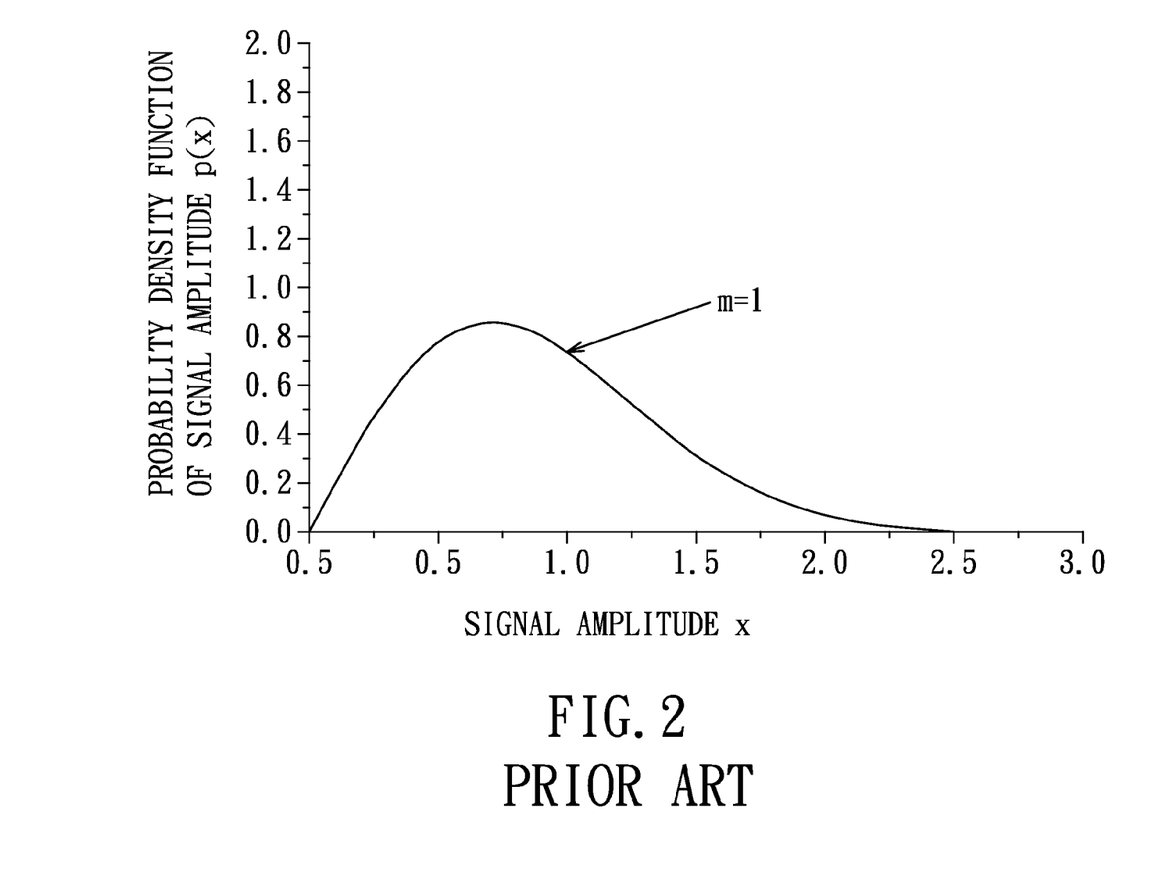
FIG. 2 is a plot to illustrate Rayleigh distribution.

In "Analysis of Transmit Antenna Selection/Maximal-Ratio Combining in Rayleigh Fading Channels," *IEEE Trans. Veh. Technol.*, Vol. 54, No. 4, pages 1312-1321, July 2005, Z. Chen et al. propose a method for evaluating performance of the conventional transceiver system 9 by using Rayleigh fading model (see Rayleigh distribution shown in FIG. 2) to simulate the channels of the conventional transceiver system 9. Further, X. Zhang et al. also propose another method for evaluating performance of the conventional transceiver system 9 by using Rayleigh fading model in "Performance Analysis of Multiuser Diversity in MIMO Systems with Antenna Selection," *IEEE Trans. Wireless Commun.*, Vol. 7, No. 1, pages 15-21, January 2008. However, Rayleigh fading model is only suitable for simulation of the fading simply attributed to multipath propagation, and is inappropriate for simulation of masking, fading, or other interferences in a metropolis. Therefore, a bit error rate (BER) or a symbol error rate (SER), which is computed according to Rayleigh fading model, is not accurate.

Figure 3:
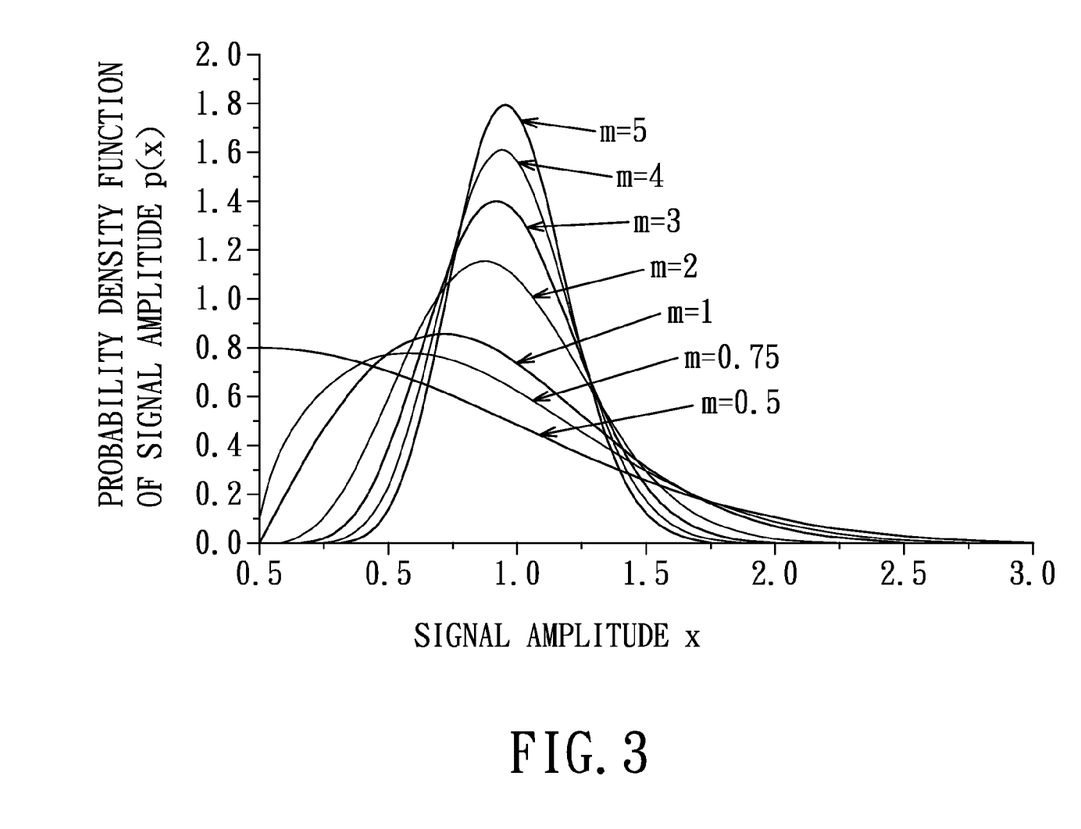
FIG. 3 is a plot to illustrate Nakagami distribution.

In "BER Performance of Transmitter Antenna Selection/Receiver-MRC over Arbitrarily Correlated Fading Channels," *IEEE Trans. Veh. Technol.*, Vol. 58, No. 6, pages 3088-3092, July 2009, B. Y. Wang and W. X. Zheng introduce a method for evaluating performance of the conventional transceiver system 9 by using Nakagami channel model (see Nakagami distribution shown in FIG. 3) to simulate the channels of the conventional transceiver system 9. Further, the modulator 91 of the conventional transceiver system 9 is configured to perform signal modulation according to binary phase-shift keying (BPSK) modulation. However, the BPSK modulation is merely the simplest form of phase-shift keying (PSK), i.e., a particular example of M-ary phase-shift keying (M-PSK) or M-ary quadrature amplitude modulation (M-QAM) with a power of 2. Therefore, the method proposed by B. Y. Wang and W. X. Zheng for estimating the BER or the SER cannot be used generally when the power of M-PSK or M-QAM is not equal to 2. In addition, this method is merely suitable to the Nakagami channel model associated with integer fading parameters, and the fading parameters are usually non-integer for estimation in a metropolis.

Addressing the drawbacks of the method proposed by B. Y. Wang and W. X. Zheng, there is an improved method for evaluating the SER described in "Performance of Multichannel Reception with Transmit Antenna Selection in Arbitrarily Distributed Nakagami Fading Channels," J. M. Romero-Jerez et al., *IEEE Trans. Wireless Commun.*, Vol. 8, No. 4, pages 2006-2013, April 2009. The method proposed by J. M. Romero-Jerez et al. is suitable for the Nakagami channel model associated with arbitrary fading parameters, and is generally useful for M-PSK and M-QAM. However, in this method, the SER is computed based upon Lauricella hypergeometric function with a number ($L_T$+1) of variables, where $L_T$ is the number of the transmit antennas 921, and thus, the computation of the SER is considerably large.

Further, Z. Chen et al. propose another improved method similar to the method proposed by J. M. Romero-Jerez et al. in "Error Performance of Maximal-Ratio Combining with Transmit Antenna Selection in Flat Nakagami-m Fading Channels," *IEEE Trans. Wireless Commun.*, Vol. 8, No. 1, pages 424-431, January 2009. In this method, an infinite polynomial with a power of ($L_T$−1) is used for evaluating the conventional transceiver system 9, and thus, the computation of evaluation is also considerably large.

SUMMARY OF THE INVENTION

Therefore, an object of the present invention is to provide an evaluation device and method involved with relatively less computation for providing a transceiver system with performance information thereof.

Accordingly, an evaluation device of the present invention is configured to provide a transceiver system with performance information thereof. The transceiver system includes a transmitter and a receiver for receiving a signal from the transmitter, and models a channel between the transmitter and the receiver using Nakagami distribution with a fading parameter. The evaluation device comprises a setting module, a computing module, and an output module.

The setting module is operable to set an average signal-to-noise ratio (SNR) for the channel between the transmitter and the receiver of the transceiver system. The computing module is operable, based upon the fading parameter and the average SNR, to estimate a symbol error rate related to the signal received by the receiver of the transceiver system. The output module is operable to provide the transceiver system with the average SNR and the symbol error rate as the performance information of the transceiver system.

According to another aspect, an evaluation method of the present invention is for providing a transceiver system with performance information thereof. The transceiver system includes a transmitter and a receiver, and models a channel between the transmitter and the receiver using Nakagami distribution with a fading parameter. The evaluation method is to be implemented using an evaluation device, and comprises the steps of:

a) configuring the evaluation device to set an average signal-to-noise ratio (SNR) for the channel between the transmitter and the receiver of the transceiver system;

b) configuring the evaluation device to estimate a symbol error rate related to the signal received by the receiver of the transceiver system based upon the fading parameter and the average SNR; and c) configuring the evaluation device to provide the transceiver system with the average SNR and the symbol error rate as the performance information of the transceiver system.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
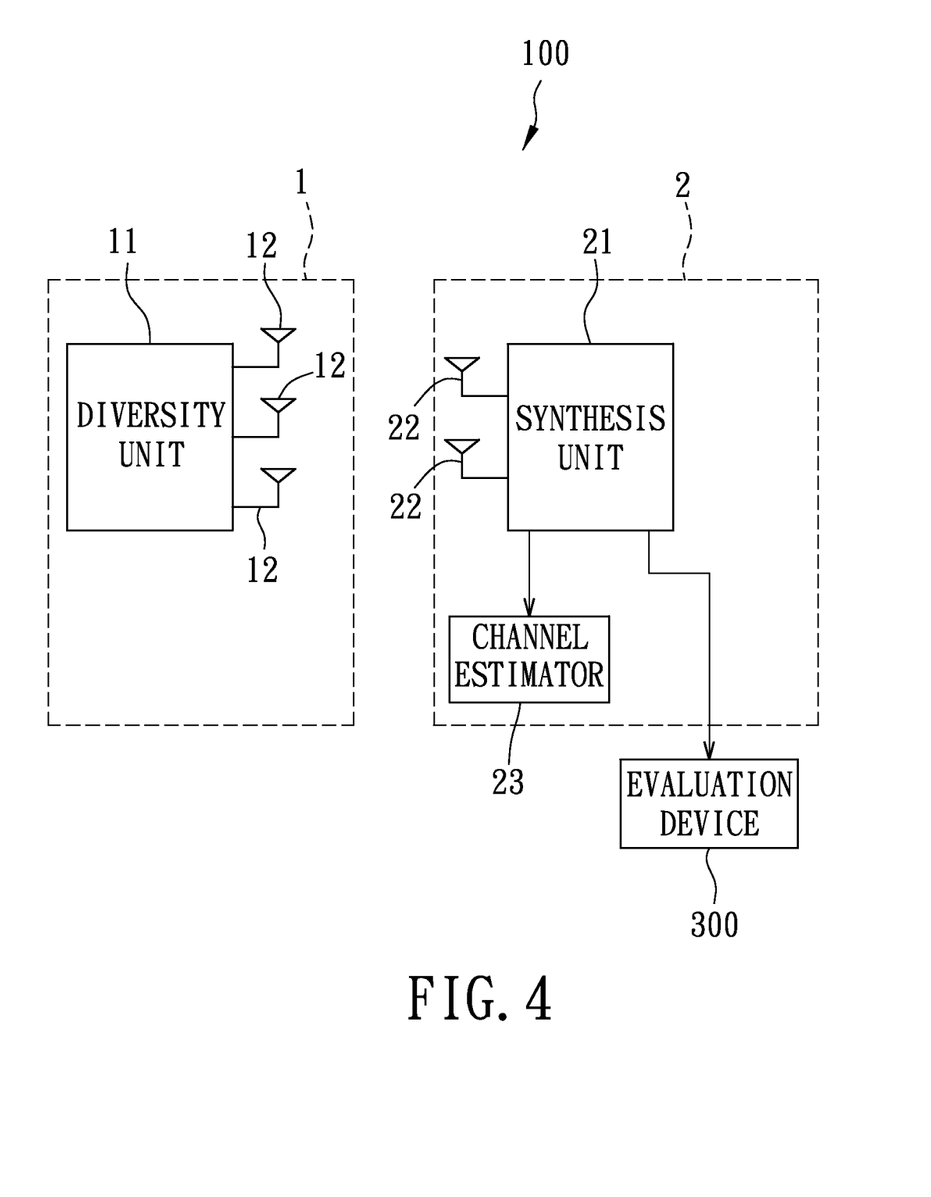
FIG. 4 is a block diagram illustrating a transceiver system provided with a preferred embodiment of an evaluation device of this invention.

Referring to FIG. 4, a transceiver system 100 under a transmit antenna selection/maximal-ratio combining (TAS/MRC) scheme includes a transmitter 1 and a receiver 2 coupled to the preferred embodiment of an evaluation device 300 of this invention. The transmitter 1 includes a diversity unit 11 and a number $L_T$ ($L_T>1$) of transmit antennas 12, and the receiver 2 includes a number $L_R$ ($L_R>1$) of receive antennas 22, a synthesis unit 21, and a channel estimator 23. For illustrative purpose, in FIG. 4, the transmitter 1 includes three ($L_T=3$) of the transmit antennas 12, and the receiver 2 includes two ($L_R=2$) of the receive antennas 22.

In such a TAS/MRC scheme, there are a number $L_T \times L_R$ of possible channels, each of which is defined by one of the transmit antennas 12 and one of the receive antennas 22 and can be simulated using Nakagami channel model (see Nakagami distribution shown in FIG. 3) with a positive fading parameter (m). The channel estimator of the receiver 2 is operable to estimate the transmission quality of each of the possible channels, and to notify the diversity unit 11 of the transmitter 1 as to which one of the transmit antennas 12 is associated with a preferred one of the possible channels having the best transmission quality. Accordingly, the diversity unit 11 of the transmitter 1 is operable to transmit signals to a selected one of the transmit antennas 12, which is associated with the preferred one of the possible channels, for transmission of the signals to the receiver 2. Subsequently, after the receiver 2 receives the signals from the transmitter 1 through the receive antennas 22, the signals are transmitted to the synthesis unit 21 that is operable to weight the signals received by the receive antennas 22 so as to obtain a synthesized signal.

In "Concise Performance Analysis of Maximal Ratio Combining with Transmit Antenna Selection in Nakagami-m Fading Channels," IEICE Transaction on Communications, Vol. E94-B, No. 2, pages 595-598, February 2011, Ching-Tai Chiang et al. disclose a method for estimating performance information of the transceiver system 100 under the TAS/MRC scheme by computing a symbol error rate (SER) or a bit error rate (BER). This method is suitable for the transceiver system 100 configured for M-ary phase-shift keying (M-PSK) and M-ary quadrature amplitude modulation (M-QAM).

When the transceiver system 100 is configured to perform signal modulation using M-PSK and the fading parameter (m) of Nakagami channel model is greater than or equal to ½, the SER ($P_{SER}$) can be expressed as Equation (1).

$$P_{SER} = a\sqrt{\frac{b}{8\pi}} \sum_{n=0}^{\infty} \frac{\alpha_n \cdot (m|\bar{\gamma})^{mL_TL_R+n}\Gamma(mL_TL_R+n+1/2)}{(mL_T/\bar{\gamma}+b/2)^{mL_TL_R+n+1/2}} \quad (1)$$

In Equation (1), $\bar{\gamma}$ is an average signal-to-noise ratio (SNR) of each of the possible channels, $(a,b)=(2, 2\sin^2(\pi/M))$, $$\Gamma(z) = \int_0^\infty t^{z-1} e^{-t} dt$$

dt for an arbitrary positive number z, $$\alpha_0 = \left[\frac{1}{\Gamma(mL_R+1)}\right]^{L_T}, \text{ and}$$

$$\alpha_n = \frac{\Gamma(mL_R+1)}{n} \sum_{j=1}^{n} \frac{j(L_T+1)-n}{\Gamma(mL_R+1+j)} \alpha_{n-j}$$

for a positive integer n. It could be appreciated from the foregoing that $\alpha_0, \alpha_1, \alpha_2, \ldots, \alpha_n$ are a sequence of rapidly decreasing convergent numbers, that is to say, $\alpha_{n-1}$ is much greater than $\alpha_n$. Therefore, when the SNR ($\bar{\gamma}$) is considerably greater than 1 (i.e., the SNR is greater than a predetermined value) and the index number (n) of the sequence ($\alpha_n$) is set as 0, Equation (1) can simplified as Equation (2) with reference to "Error Performance of Maximal-Ratio Combining with Transmit Antenna Selection in Flat Nakagami-m Fading Channels," Z. Chen et al., IEEE Trans. Wireless Commun., Vol. 8, No. 1, pages 424-431, January 2009 (hereinafter referred to as D1). In Equation (2), $(a,b)=(2, 2\sin^2(\pi/M))$.

$$P_{SER} = a\sqrt{\frac{b}{8\pi}} \frac{\Gamma(mL_TL_R+1/2)m^{mL_TL_R}}{[\Gamma(mL_R+1)]^{L_T}(b/2)^{mL_TL_R+1/2}} \bar{\gamma}^{-mL_TL_R} \quad (2)$$

It could be appreciated from the foregoing that it is only needed to compute the summation of the infinite series ($\alpha_n$) in Equation (1). Thus, the computation of the SER using Equation (1) is significantly less than the computation of the SER in D1 when the number ($L_T$) of the transmit antennas 12 is relatively greater. Further, Equation (2) is simplified from Equation (1) without the summation of the infinite series ($\alpha_n$), and computation of the SER using Equation (2) is relatively less.

Further, when the transceiver system 100 is configured to perform signal modulation using binary phase-shift keying (BPSK) or binary frequency-shift keying (BFSK), Equations (1) and (2) can be also used for computing the SER with respect to BPSK and BFSK with (a,b)=(1,2) and (a,b)=(1,1), respectively.

Regarding the transceiver system 100 configured to perform signal modulation using M-PSK, the SER ($P_{SER}$) can be expressed as Equation (3) when a product ($m \times L_R$) of the fading parameter (m) and the number ($L_R$) of the receive antennas 22 is a positive integer.

$$P_{SER} = a\sqrt{\frac{b}{8\pi}} \sum_{i=0}^{L_T} \binom{L_T}{i}(-1)^j \sum_{n=0}^{i(mL_R-1)} \frac{\beta_n \cdot (m/\bar{\gamma})^n \Gamma(n+1/2)}{(mi/\bar{\gamma}+b/2)^{n+1/2}} \quad (3)$$

In Equation (3), (a,b)=(2, 2 sin²(π/M)), $$\Gamma(z) = \int_0^\infty t^{z-1} e^{-t} dt$$

dt for an arbitrary positive number z, $$\binom{L_T}{i} = \frac{L_T!}{i!(L_T-i)!}, \beta_0 = 1, \text{ and}$$

$$\beta_n = \frac{1}{n} \sum_{j=1}^{min(n,mL_R-1)} \frac{j(i+1)-n}{j!} \beta_{n-j}$$

for a positive integer n. It should be noted that the computation of the SER ($P_{SER}$) in Equation (3) is only involved with two terms of summation of finite sequence. Similarly, Equation (3) can be used for computing the SER with respect to BPSK and BFSK with (a,b)=(1,2) and (a,b)=(1,1), respectively.

When the transceiver system 100 is configured to perform signal modulation using M-QAM and the fading parameter (m) of Nakagami channel model is greater than or equal to ½, the SER ($P_{SER}$) can be expressed as Equation (4).

$$P_{SER} = \frac{1}{2} \sum_{n=0}^{\infty} \alpha_n \cdot \quad (4)$$

$$\left(\frac{m}{\bar{\gamma}}\right)^{n+mL_TL_R} \left\{ \sqrt{\frac{b}{2\pi}} \frac{(a-c)\Gamma(n+mL_TL_R+1/2)}{(mL_T/\bar{\gamma}+b/2)^{n+mL_TL_R+1/2}} + \frac{bc}{\pi} \frac{\Gamma(n+mL_TL_R+1)}{(mL_T/\bar{\gamma}+b)^{n+mL_TL_R+1}} {}_2F_1\left(n+mL_TL_R+1, 1; \frac{3}{2}; \frac{b}{2(mL_T/\bar{\gamma}+b)}\right) \right\}$$

In Equation (4), $_2F_1(\cdot,\cdot;\cdot;\cdot)$ is the Gauss hypergeometric function, and (a,b,c)=(4($\sqrt{M}$-1)/$\sqrt{M}$,3/(M-1),4($\sqrt{M}$-1)²/M). Similarly, $\alpha_{n-1}$ is much greater than $\alpha_n$, and, Equation (4) can simplified as Equation (5) when the SNR ($\bar{\gamma}$) is considerably greater than 1 (i.e., the SNR is greater than a predetermined value) and the index number (n) of the sequence ($\alpha_n$) is set as 0. In Equation (5), (a,b,c)=(4($\sqrt{M}$-1)/$\sqrt{M}$,3/(M-1),4($\sqrt{M}$-1)²/M).

$$P_{SER} = \frac{(m/b)^{mL_TL_R}}{2[\Gamma(mL_TL_R+1)]^{L_T}} \left\{ \frac{(a-c)\Gamma(mL_TL_R+1/2)}{\sqrt{\pi}(1/2)^{mL_TL_R}} + \frac{c\Gamma(mL_TL_R+1)}{\pi} {}_2F_1\left(mL_TL_R+1, 1; \frac{3}{2}; \frac{1}{2}\right) \right\} \bar{\gamma}^{-mL_TL_R} \quad (5)$$

Regarding the transceiver system 100 configured to perform signal modulation using M-QAM, the SER ($P_{SER}$) can be expressed as Equation (6) when the product ($m \times L_R$) of the fading parameter (m) and the number ($L_R$) of the receive antennas 22 is a positive integer. In Equation (6), (a,b,c)=(4($\sqrt{M}$-1)/$\sqrt{M}$,3/(M-1),4($\sqrt{M}$-1)²/M).

$$P_{SER} = \frac{1}{2} \sum_{i=0}^{L_T} \binom{L_T}{i}(-1)^j \sum_{n=0}^{i(mL_R-1)} \beta_n \left(\frac{m}{\bar{\gamma}}\right)^n \left\{ \sqrt{\frac{b}{2\pi}} \frac{(a-c)\Gamma(n+1/2)}{(mi/\bar{\gamma}+b/2)^{n+1/2}} + \frac{bc}{\pi} \frac{\Gamma(n+1)}{(mi/\bar{\gamma}+b)^{n+1}} {}_2F_1\left(n+1, 1; \frac{3}{2}; \frac{b}{(mi/\bar{\gamma}+b)}\right) \right\} \quad (6)$$

Figure 5:
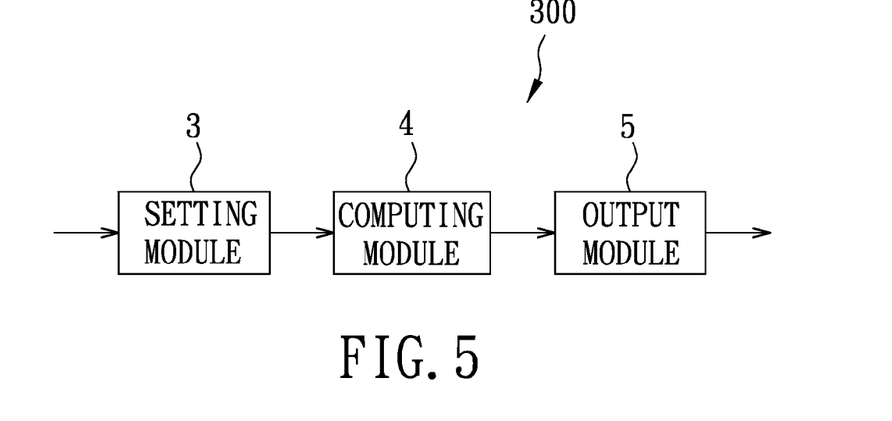
FIG. 5 is a block diagram illustrating the evaluation device of the preferred embodiment.

Referring to FIGS. 4 and 5, the evaluation device 300 of the preferred embodiment is configured for analyzing the synthesizing signal from the synthesis unit 21 so as to provide the transceiver system 100 with the performance information of the transceiver system 100. The evaluation device 300 includes a setting module 3, a computing module 4 coupled to the setting module 3, and an output module 5 coupled to the computing module 4.

The setting module 3 is operable to set the average signal-to-noise ratio ($\bar{\gamma}$) for the possible channels between the transmitter 1 and the receiver 2 of the transceiver system 100. Based upon the fading parameter (m) of Nakagami distribution, the average SNR ($\bar{\gamma}$), the number ($L_T$) of the transmit antennas 12, and the number ($L_R$) of the receive antennas 22, the computing module 4 is operable to estimate the symbol error rate ($P_{SER}$) related to the signal received by the receiver 2 according to an appropriate one of Equations (1) to (6). Then, the output module 5 is operable to provide the transceiver system 100 with the average SNR ($\bar{\gamma}$) and the SER ($P_{SER}$) as the performance information of the transceiver system 100.

Figure 6:
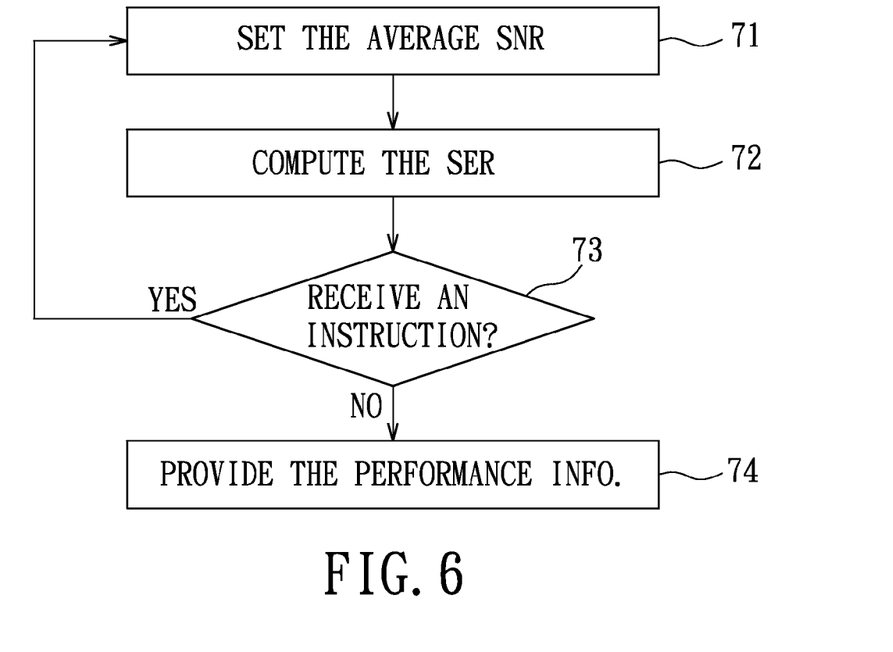
FIG. 6 is a flow chart of a preferred embodiment of an evaluation method of this invention.

FIG. 6 shows a flow chart of the preferred embodiment of an evaluation method according to this invention. The evaluation is to be implemented by the evaluation device 300, and includes the following steps.

In step 71, the setting module 3 is operable to set each of the possible channels with the same average SNR ($\bar{\gamma}$).

In step 72, the computing module 4 is operable to compute the SER ($P_{SER}$) of the transceiver system 100. In this embodiment, the computing module 4 is operable in advance to determine whether the product ($m \times L_R$) of the fading parameter (m) and the number ($L_R$) is a positive integer.

Then, when the product ($m \times L_R$) of the fading parameter (m) and the number ($L_R$) is a positive integer, the computing module 4 is operable to compute the SER ($P_{SER}$) based upon Equation (3) for M-PSK and based upon Equation (6) for M-QAM. When it is determined that the product ($m \times L_R$) is not a positive integer, the computing module 4 is operable to compute the SER ($P_{SER}$) based upon Equation (1) or (2) for M-PSK and based upon Equation (4) or (5) for M-QAM. In particular, when the product ($m \times L_R$) is not a positive integer, the computing module 4 is operable to compute the SER ($P_{SER}$) based upon Equation (2) for M-PSK and based upon Equation (5) for M-QAM while the average SNR ($\bar{\gamma}$) set in step 71 is greater than the predetermined value, and based upon Equation (1) for M-PSK and based upon Equation (4) for M-QAM while the average SNR ($\bar{\gamma}$) is not greater than the predetermined value.

Certainly, in other embodiments, the computing module 4 may be operable in advance to determine whether the fading parameter (m) is greater than or equal to ½, to compute the SER ($P_{SER}$) based upon Equation (1) or (2) for M-PSK and based upon Equation (4) or (5) for M-QAM when affirmative, and to compute the SER ($P_{SER}$) based upon Equation (3) for M-PSK and based upon Equation (6) for M-QAM when otherwise.

Since it is impractical to calculate the summation of the infinite series $$(\sum_{n=0}^{\infty})$$

in Equations (1) and (4) in practice, the computing module 4 is operable to count a limited number of the series. For example, in this embodiment, the computing module 4 is operable to count the series for n=0~40 when computing the summation.

In step 73, the output module 6 is operable to determine whether there is an instruction of setting another average SNR ($\bar{\gamma}$). The flow goes back step 71 when the determination is affirmative, and goes to step 74 when otherwise.

In step 74, the output module 6 is operable to provide the transceiver system 100 with the SER ($P_{SER}$) corresponding to each of the average SNRs ($\bar{\gamma}$) set in step 71 as the performance information of the transceiver system 100.

It should be noted that, in other embodiments, the transmitter 1 may include only one transmit antenna 12 (i.e., $L_T$=1), and thus, the diversity unit 11 could be omitted and the signal is transmitted through said only one transmit antenna 12. Similarly, the receiver 2 may include only one receive antenna 22 (i.e., $L_R$=1), so that the synthesis unit 21 could be omitted and the evaluation device 300 directly analyzes the signal received from said only one receive antenna 22.

Figure 7:
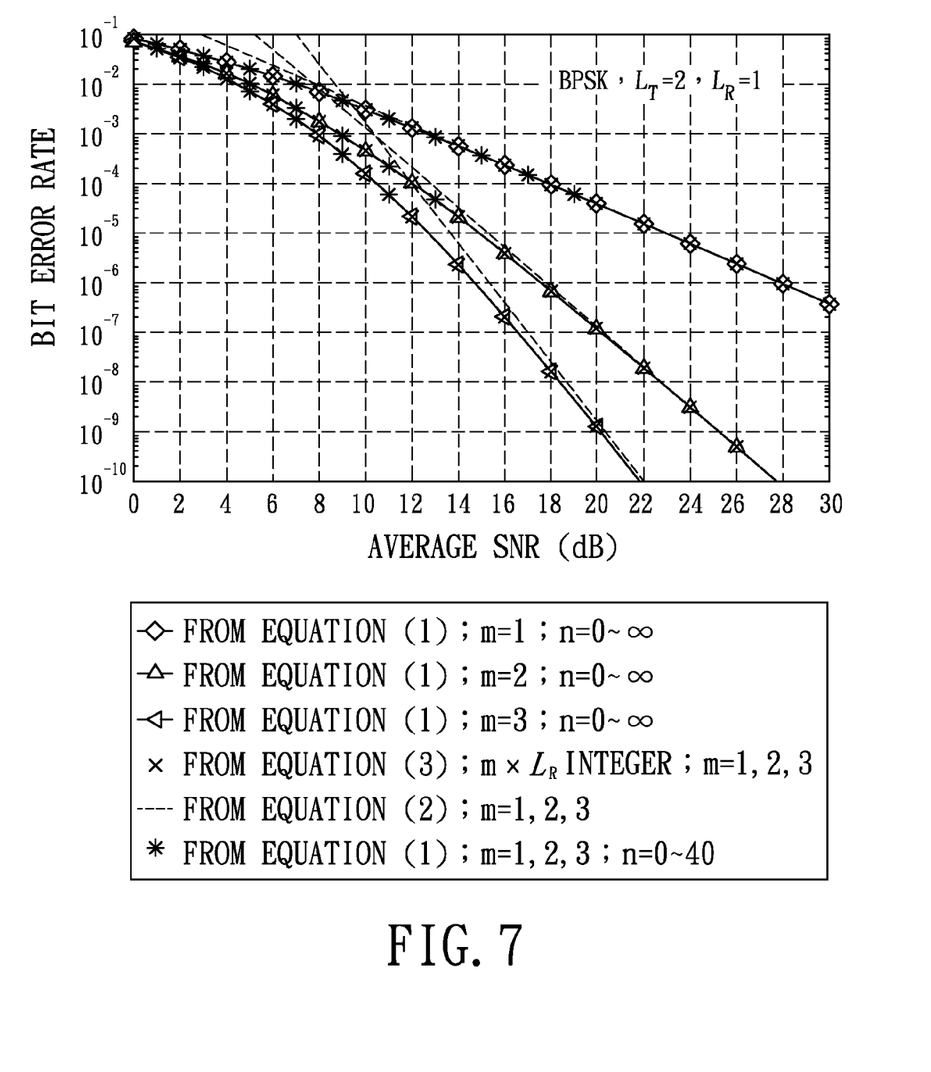
FIGS. 7 to 10 are simulation plots each of which illustrates a relationship between an average signal-to-noise ratio and a symbol error rate associated with a respective type of signal modulation.

FIG. 7 shows the evaluation results for the transceiver system 100 with BPSK of signal modulation having two transmit antennas 12 ($L_T$=2) and one receive antenna 22 ($L_R$=1). In FIG. 7, the symbols ◊, Δ and ◁ represent the SERs ($P_{SER}$) respectively for the fading parameters (m=1, 2, 3) from Equation (1) with the summation of the infinite series $$(\sum_{n=0}^{\infty}),$$

and the dashed lines " - - - " are respective asymptotes of the SERs ($P_{SER}$) based upon Equation (2). The symbols x represent the SERs ($P_{SER}$) for the fading parameters (m=1, 2, 3) from Equation (3) with the product (m×$L_R$) of the fading parameter (m) and the number ($L_R$) of the receive antennas 22 being a positive integer. The symbols * represent the SERs ($P_{SER}$) from Equation (1) with the summation of the series $$(\sum_{n=0}^{40})$$

for n=0~40.

It could be appreciated from FIG. 7 that the bit error rates decrease as the average SNRs ($\bar{\gamma}$) increase, that is to say, transmission error of the transceiver system 100 decreases and the performance thereof is relatively better. Also, for the bit error rates corresponding to the same average SNR ($\bar{\gamma}$), the greater the fading parameters (m), the less the bit error rates. Further, the results computed according to Equation (2) are relatively approximate to the results computed according to Equation (1) when the average SNRs ($\bar{\gamma}$) are relatively greater, that is to say, the simplified Equation (2) is practical for computing the bit error rate when the average SNRs ($\bar{\gamma}$) are greater than a predetermined value. Moreover, according to Equation (1), the results computed with the summation of the series $$(\sum_{n=0}^{40})$$

for n=0~40 are closely approximate to the results computed with the summation of the infinite series $$(\sum_{n=0}^{\infty})$$

so that truncation errors therebetween can be ignored.

Figure 8:
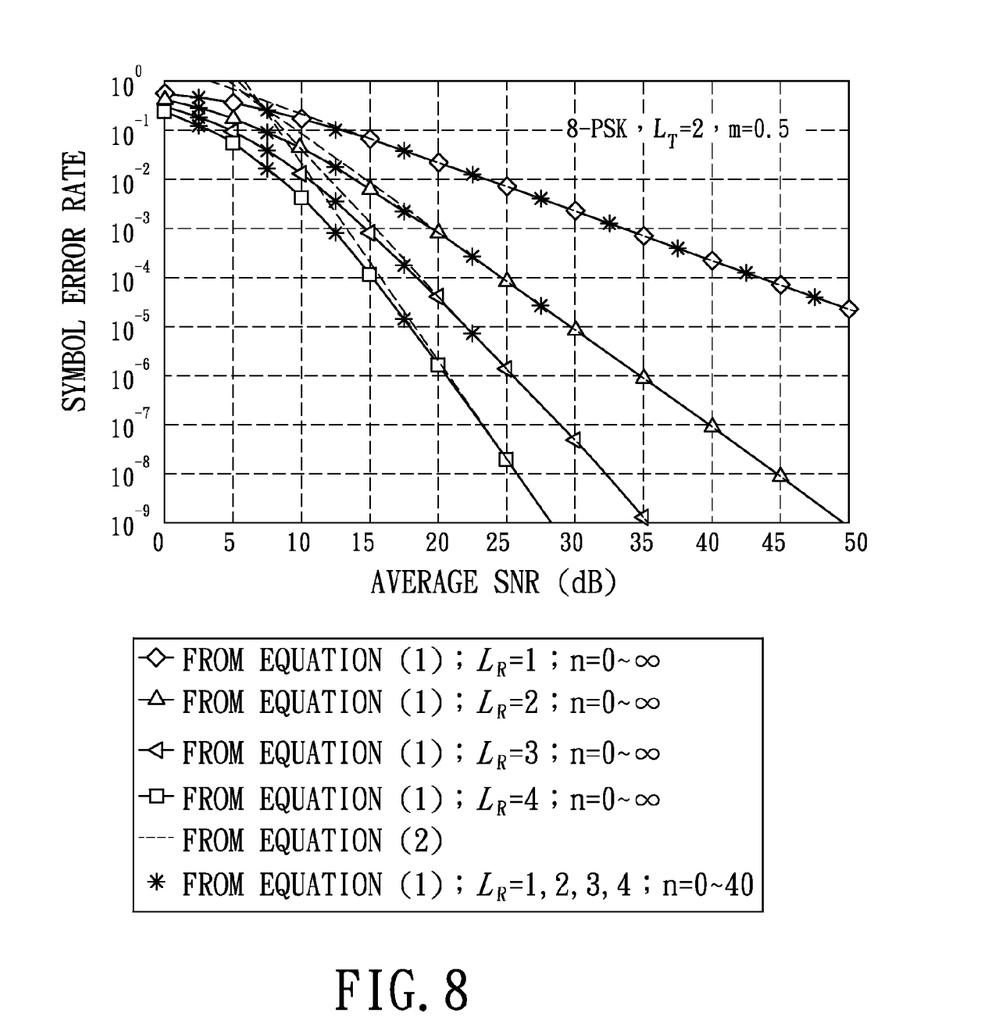

FIG. 8 shows the evaluation results for the transceiver system 100 with 8-PSK of signal modulation having two transmit antennas 12 ($L_T$=2) and various numbers of the receive antennas 22 ($L_R$=1 to 4), and the fading parameter (m) of Nakagami distribution is set as 0.5. The symbols ◊, Δ, ◁ and □ represent the SERs ($P_{SER}$) computed according to Equation (1) with the summation of the infinite series $$(\sum_{n=0}^{\infty})$$

when $L_R$=1 to 4, respectively, and the dashed lines " - - - " are respective asymptotes of the SERs ($P_{SER}$) from Equation (2). The symbols * represent the SERs ($P_{SER}$) computed according to Equation (1) with the summation of the series $$(\sum_{n=0}^{40})$$

for n=0~40.

It could be appreciated from FIG. 8 that the SERs ($P_{SER}$) decrease as the average SNRs ($\bar{\gamma}$) increase, that is to say, transmission error of the transceiver system 100 decreases and the performance thereof is relatively better. Also, for the SERs ($P_{SER}$) corresponding to the same average SNR ($\bar{\gamma}$), the greater the number ($L_R$) of the receive antennas 22, the less the SERs ($P_{SER}$). Similarly, the results computed according to Equations (1) and (2) are relatively approximate to each other when the average SNRs ($\bar{\gamma}$) are relatively greater than a predetermined value, and the truncation errors between the results from Equation (1) with the summation of the series $$(\sum_{n=0}^{40})$$

for n=0~40 and the results from Equation (1) with the summation of the infinite series $$(\sum_{n=0}^{\infty})$$

can be ignored.

Figure 9:
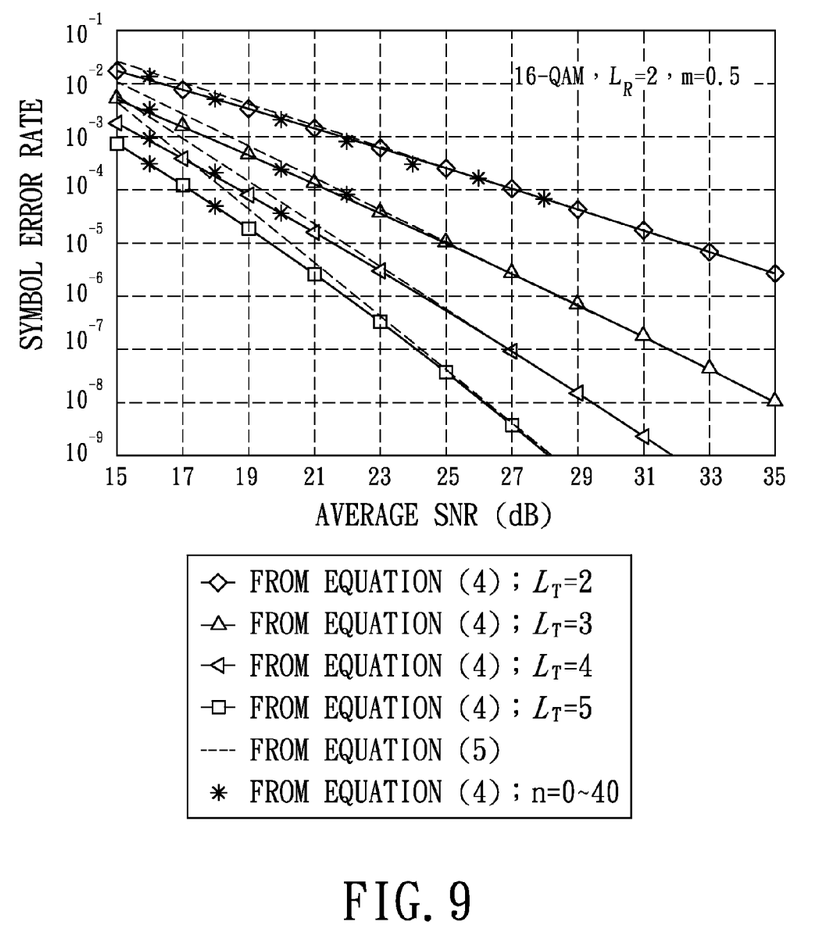
Figure 10:
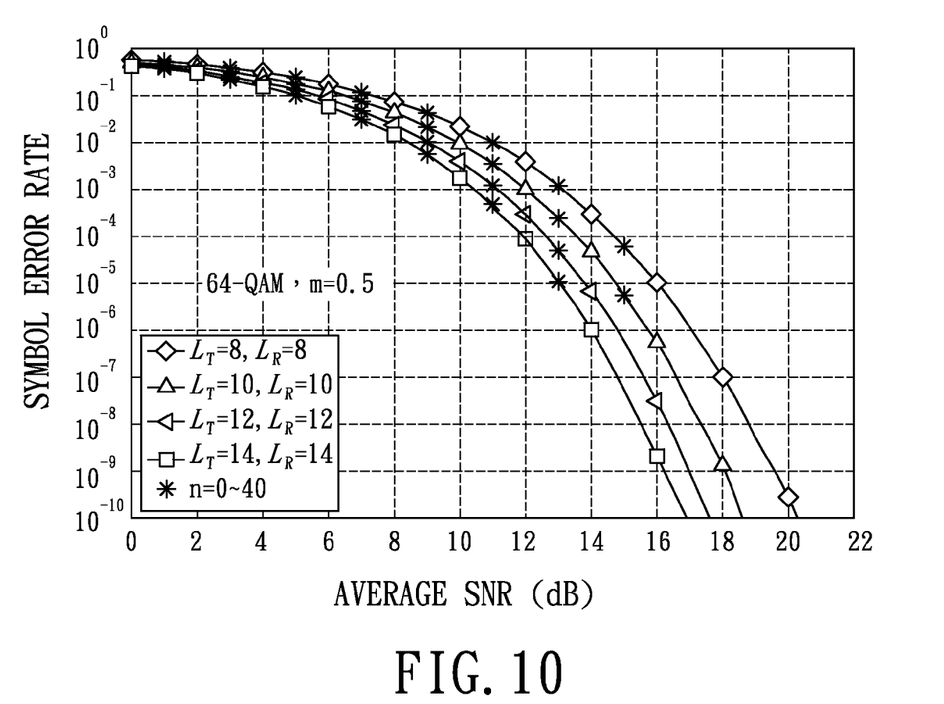

Similarly, FIGS. 9 and 10 show the evaluation results for the transceiver system 100 configured for 16-QAM and 64-QAM, respectively, and the fading parameter (m) of Nakagami distribution is set as 0.5. In the case of FIG. 9, the transceiver system 100 includes two receive antennas 22 ($L_R$=2) and various numbers of the transmit antennas 12 ($L_T$=2 to 5). The symbols ◊, Δ, ◁ and □ represent the SERs ($P_{SER}$) computed according to Equation (4) when $L_R$=2 to 5, respectively, and the dashed lines " - - - " are respective asymptotes of the SERs ($P_{SER}$) from Equation (5). The symbols * represent the SERs ($P_{SER}$) computed according to Equation (4) with the summation of the series $$(\sum_{n=0}^{40})$$

for n=0~40. In FIG. 10, the symbols ◊ represent the SERs ($P_{SER}$) when $L_T$=8 and $L_R$=8, the symbols Δ represent the SERs ($P_{SER}$) when $L_T$=10 and $L_R$=10, the symbols ◁ represent the SERs ($P_{SER}$) when $L_T$=12 and $L_R$=12, the symbols □ represent the SERs ($P_{SER}$) when $L_T$=14 and $L_R$=14, and the symbols * represent the SERs ($P_{SER}$) computed with the summation of the series $$(\sum_{n=0}^{40})$$

for n=0~40. The above-mentioned features can be also appreciated from FIGS. 9 and 10.

In conclusion, the evaluation device 300 according to the present invention is capable of computing the SER ($P_{SER}$) for Nakagami distribution with arbitrary positive fading parameter (m) so that the evaluation device 300 is suitable for simulating the performance of the transceiver system 100 in a metropolis. In addition, Equations (1), (3), (4) and (6) for computing the SER ($P_{SER}$) are relatively simple, and the simplified Equations (2) and (5) respectively from Equations (1) and (4) are practical when the average SNR ($\bar{\gamma}$) is greater than a predetermined value. Thus, computation of the SER ($P_{SER}$) based upon Equations (1) to (6) is relatively less.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An evaluation method for providing a transceiver system with performance information thereof, the transceiver system including a transmitter and a receiver, and modeling a channel between the transmitter and the receiver using Nakagami distribution with a fading parameter, and being configured to perform signal modulation using M-ary phase-shift keying, the transmitter having a plurality of transmit antennas, the receiver having a plurality of receive antennas, said evaluation method to be implemented using an evaluation device and comprising the steps of:
   a) configuring the evaluation device to set an average signal-to-noise ratio (SNR) for the channel between the transmitter and the receiver of the transceiver system;
   b) configuring the evaluation device to estimate a symbol error rate related to the signal received by the receiver of the transceiver system based upon the fading parameter, the average SNR, a number of the transmit antennas, and a number of the receive antennas; and
   c) configuring the evaluation device to provide the transceiver system with the average SNR and the symbol error rate as the performance information of the transceiver system;

wherein in step b), when the fading parameter is greater than or equal to ½, the evaluation device is configured to estimate the symbol error rate PSER based upon $$P_{SER} = a\sqrt{\frac{b}{8\pi}} \sum_{n=0}^{\infty} \frac{\alpha_n \cdot (m/\bar{\gamma})^{mL_TL_R+n}\Gamma(mL_TL_R+n+1/2)}{(mL_T/\bar{\gamma}+b/2)^{mL_TL_R+n+1/2}},$$

where m is the fading parameter, $L_T$ is the number of the transmit antennas of the transmitter, $L_R$ is the number of the receive antennas of the receiver, $\bar{\gamma}$ is the average SNR, $(a,b)=(2, 2\sin^2(\pi/M))$, $$\Gamma(z) = \int_0^\infty t^{z-1}e^{-t}dt$$

for an arbitrary positive number z, $$\alpha_0 = \left[\frac{1}{\Gamma(mL_R+1)}\right]^{L_T}, \text{ and}$$

$$\alpha_n = \frac{\Gamma(mL_R+1)}{n}\sum_{j=1}^{n}\frac{j(L_T+1)-n}{\Gamma(mL_R+1+j)}\alpha_{n-j}$$

for a positive integer n.

2. The evaluation method as claimed in claim 1, wherein in step b), when the fading parameter is greater than or equal to ½ and the average SNR is greater than a predetermined value, the evaluation device is configured to estimate the symbol error rate $P_{SER}$ based upon $$P_{SER} = a\sqrt{\frac{b}{8\pi}}\frac{\Gamma(mL_TL_R+1/2)m^{mL_TL_R}}{[\Gamma(mL_R+1)]^{L_T}(b/2)^{mL_TL_R+1/2}}\bar{\gamma}^{-mL_TL_R}.$$

3. The evaluation method as claimed in claim 1, wherein in step b), when a product of the fading parameter and the number of the receive antennas of the receiver is a positive integer, the evaluation device is configured to estimate the symbol error rate $P_{SER}$ based upon $$P_{SER} = a\sqrt{\frac{b}{8\pi}}\sum_{i=0}^{L_T}\binom{L_T}{i}(-1)^i\sum_{n=0}^{i(mL_R-1)}\frac{\beta_n \cdot (m/\bar{\gamma})^n\Gamma(n+1/2)}{(mi/\bar{\gamma}+b/2)^{n+1/2}}$$

where $$\binom{L_T}{i} = \frac{L_T!}{i!(L_T-i)!}, \beta_0 = 1, \text{ and}$$

$$\beta_n = \frac{1}{n}\sum_{j=1}^{min(n,mL_R-1)}\frac{j(i+1)-n}{j!}\beta_{n-j}$$

for a positive integer n.

4. The evaluation method as claimed in claim 1, the transceiver system being further configured to perform signal modulation using M-ary quadrature amplitude modulation, wherein in step b), when the fading parameter is greater than or equal to ½, the evaluation device is configured to estimate the symbol error rate $P_{SER}$ based upon $$P_{SER} = \frac{1}{2} \sum_{n=0}^{\infty} \alpha_n \cdot \left(\frac{m}{\bar{\gamma}}\right)^{n+mL_TL_R}$$

$$\left\{ \sqrt{\frac{b}{2\pi}} \frac{(a-c)\Gamma(n+mL_TL_R+1/2)}{(mL_T/\bar{\gamma}+b/2)^{n+mL_TL_R+1/2}} + \frac{bc}{\pi} \frac{\Gamma(n+mL_TL_R+1)}{(mL_T/\bar{\gamma}+b)^{n+mL_TL_R+1}} \right.$$

$$\left. {}_2F_1\!\left(n+mL_TL_R+1, 1; \frac{3}{2}; \frac{b}{2(mL_T/\bar{\gamma}+b)}\right) \right\},$$

where $(a,b,c) = (4(\sqrt{M}-1)/\sqrt{M}, 3/(M-1), 4(\sqrt{M}-1)^2/M)$, ${}_2F_1(\bullet,\bullet;\bullet;\bullet)$ is the Gauss hypergeometric function, $$\alpha_0 = \left[\frac{1}{\Gamma(mL_R+1)}\right]^{L_T} \text{ and}$$

$$\alpha_n = \frac{\Gamma(mL_R+1)}{n} \sum_{j=1}^{n} \frac{j(L_T+1)-n}{\Gamma(mL_R+1+j)} \alpha_{n-j}$$

for a positive integer n.

5. The evaluation method as claimed in claim 1, the transceiver system being further configured to perform signal modulation using M-ary quadrature amplitude modulation, wherein in step b), when the fading parameter is greater than 15 or equal to ½ and the average SNR is greater than a predetermined value, the evaluation device is configured to estimate the symbol error rate $P_{SER}$ based upon $$P_{SER} = \frac{(m/b)^{mL_TL_R}}{2[\Gamma(mL_TL_R+1)]^{L_T}}$$

$$\left\{ \frac{(a-c)\Gamma(mL_TL_R+1/2)}{\sqrt{\pi}(1/2)^{mL_TL_R}} + \frac{c\Gamma(mL_TL_R+1)}{\pi} {}_2F_1\!\left(mL_TL_R+1, 1; \frac{3}{2}; \frac{1}{2}\right) \right\}$$

$$\bar{\gamma}^{-mL_TL_R},$$

where $(a,b,c) = (4(\sqrt{M}-1)/\sqrt{M}, 3/(M-1), 4(\sqrt{M}-1)^2/M)$, and ${}_2F_1(\bullet,\bullet;\bullet;\bullet)$ is the Gauss hypergeometric function.

6. The evaluation method as claimed in claim 1, the transceiver system being further configured to perform signal modulation using M-ary quadrature amplitude modulation, wherein in step b), when a product of the fading parameter and the number of the receive antennas of the receiver is a positive integer, the evaluation device is configured to estimate the symbol error rate $P_{SER}$ based upon $$P_{SER} = \frac{1}{2} \sum_{i=0}^{L_T} \binom{L_T}{i}(-1)^i \sum_{n=0}^{i(mL_R-1)} \beta_n \left(\frac{m}{\bar{\gamma}}\right)^n \left\{ \sqrt{\frac{b}{2\pi}} \frac{(a-c)\Gamma(n+1/2)}{(mi/\bar{\gamma}+b/2)^{n+1/2}} + \right.$$

$$\left. \frac{bc}{\pi} \frac{\Gamma(n+1)}{(mi/\bar{\gamma}+b)^{n+1}} {}_2F_1\!\left(n+1, 1; \frac{3}{2}; \frac{b}{2(mi/\bar{\gamma}+b)}\right) \right\},$$

where $$(a, b, c) = \left(4(\sqrt{M}-1)/\sqrt{M},\, 3/(M-1),\, 4(\sqrt{M}-1)^2/M\right),$$

$$\binom{L_T}{i} = \frac{L_T!}{i!(L_T-i)!},$$

$$\beta_0 = 1, \text{ and } \beta_n = \frac{1}{n} \sum_{j=1}^{\min(n, mL_R-1)} \frac{j(i+1)-n}{j!} \beta_{n-j}$$

for a positive integer n.

* * * * *